United States Patent
Kaji et al.

(10) Patent No.: US 10,801,571 B2
(45) Date of Patent: Oct. 13, 2020

(54) FRICTION MATERIAL

(71) Applicant: Nisshinbo Brake, Inc., Tokyo (JP)

(72) Inventors: Shinya Kaji, Gunma-ken (JP); Makoto Tamura, Gunma-ken (JP); Mitsuaki Yaguchi, Gunma-ken (JP)

(*) Notice: Subject to any disclaimer, the term of this patent is extended or adjusted under 35 U.S.C. 154(b) by 222 days.

(21) Appl. No.: 15/328,446

(22) PCT Filed: Jul. 24, 2014

(86) PCT No.: PCT/JP2014/069521
§ 371 (c)(1),
(2) Date: Jan. 23, 2017

(87) PCT Pub. No.: WO2016/013078
PCT Pub. Date: Jan. 28, 2016

(65) Prior Publication Data
US 2017/0234390 A1    Aug. 17, 2017

(51) Int. Cl.
*F16D 69/02*    (2006.01)

(52) U.S. Cl.
CPC .... *F16D 69/026* (2013.01); *F16D 2200/0069* (2013.01)

(58) Field of Classification Search
CPC ...................... F16D 69/026; F16D 2200/0069
See application file for complete search history.

(56) References Cited

U.S. PATENT DOCUMENTS

| 6,612,415 | B2 * | 9/2003 | Yamane | B29C 43/006 |
| | | | | 156/153 |
| 6,887,549 | B2 * | 5/2005 | Suzuki | F16D 69/026 |
| | | | | 188/251 A |
| 2010/0331447 | A1 | 12/2010 | Schoo et al. | |

FOREIGN PATENT DOCUMENTS

| CN | 102635653 A | 8/2012 |
| EP | 1482204 A1 | 12/2004 |
| JP | 1996-135701 | 5/1996 |
| JP | 2012107084 A | 6/2012 |
| JP | 2012-255051 | 12/2012 |
| WO | WO2012066966 A1 | 5/2012 |

* cited by examiner

*Primary Examiner* — Cephia D Toomer
(74) *Attorney, Agent, or Firm* — Apex Juris PLLC; Tracy M Heims

(57) ABSTRACT

The present invention provides a friction material used for a disc brake pad, which is able to secure the braking effectiveness and the wear resistance under the high speed and high load braking conditions while satisfying laws and regulations relating to the required amount of the content of the copper component. A friction material used for a disc brake pad, which is manufactured by forming a non-asbestos organic friction material composition, in which the friction material composition contains 1-15 weight % of ferrous sulfide (FeS) particles relative to the total amount of the friction material composition as a lubricant, and the total amount of the copper component involved in the friction material composition is less than 5 weight % relative to the total amount of the friction material composition. Furthermore, it is preferable to contain 0.3-5 weight % of flaky graphite particles with 1-100 μm of average particle diameter or the aggregates thereof relative to the total amount of the friction material composition.

3 Claims, No Drawings

FRICTION MATERIAL

DETAIL DESCRIPTION OF THE INVENTION

Field of the Invention

This invention relates to a friction material used for a disc brake pad of an automobile or the like, which is manufactured by forming a non-asbestos-organic (NAO) friction material composition.

Background of Invention

Conventionally, a disc brake is used as a brake device of an automobile, and a disc brake pad manufactured by fixing the friction material on a metallic base member is used as a friction member of the disc brake.

The friction material is classified into a semi-metallic friction material containing, as a fiber base material, 30 weight % or more but less than 60 weight % of a steel fiber relative to the total amount of the friction material composition, a low steel friction material containing a steel fiber in a part of the fiber base material as well as less than 30 weight % of the steel fiber relative to the total amount of the friction material composition, and the NAO friction material containing no steel-based fiber such as the steel fiber and a stainless steel fiber.

The friction material causing less braking noise is demanded of late years, it is a recent trend to use the disc brake pad that uses the NAO friction material that does not contain the steel fiber and the steel-based fiber but mainly contains such as a binder, a fiber base material, a lubricant, a titanate, an inorganic friction modifier, an organic friction modifier, pH adjuster, a filler, and the like.

For the NAO friction material for the disc brake pad, in order to secure the braking effectiveness and the wear resistance under the high speed and high load braking condition, about 5-20 weight % of a copper component such as fibers and/or particles of copper and/or copper alloy in total relative to the total amount of the friction material composition, is added as a necessary component.

However, recently, the above-described friction material, when braking, discharges the copper as abrasion powder, and it is suggested that the discharged copper flows in a river, lake, and/or ocean and then the copper possibly contaminates an area around the discharged copper.

Because of these background, for example, California State (CA) and Washington State (WA) of the United States of America passed a bill to prohibit the sales of the friction member using the friction material containing 5 weight % or more of the copper component relative to the total amount of the friction material composition and an act of assembling the subject friction material in a new car from the year of 2021, and the sales of the friction member using the friction material containing 0.5 weight % or more of the copper component relative to the total amount of the friction material composition and an act of assembling the subject friction material in a new car several years later from above year of 2021.

Then, as this type of laws and regulations are expected to be spread out in the world from now on, the elimination of the copper component contained in the NAO friction material is urgently needed, and an issue is to improve the braking effectiveness and wear resistance, which are generally deteriorated due to the elimination of the copper component contained in the NAO friction material, under the high speed and high load braking conditions.

The Patent Document 1 discloses the friction material, which is manufactured by forming the friction material composition containing 0.5-50 weight % of metal tins or tin alloy relative to the total amount of the friction material composition and containing 0.001-4.999 weight % of copper relative to the total amount of the friction material composition.

The Patent Document 2 discloses the friction material composition including the binder, the organic filler, inorganic filler, and the fiber base, and discloses the NAO friction material composition contains 5 or lower mass % of the copper element, 0.5 or lower mass % of the metal fiber other than copper and copper alloy, titanate and antimony trisulfide, and 10-35 mass % of said titanate, and the friction material member formed by using the friction material which is manufactured by forming the NAO friction material composition and the back plate.

The friction materials disclosed in the Patent Document 1 and the Patent Document 2 satisfy the laws and regulations relating to the required amount of the content of the copper component contained therein; however, it cannot be said that the sufficient braking effectiveness and wear resistance under the high speed and high load braking conditions are secured.

PRIOR ARTS

Patent Documents

[PATENT DOCUMENT 1] US Provisional Patent Publication No. 2010/0331447

[PATENT DOCUMENT 2] Japanese Provisional Patent Publication No. 2012-255051

SUMMARY OF INVENTION

Problems to be Resolve the Invention

An object of this invention is to provide a friction material manufactured by forming a non-asbestos-organic (NAO) friction material composition, which is used for a disc brake pad, in which the friction material is able to secure a braking effectiveness and wear resistance under the high speed and high load braking conditions while satisfying laws and regulations relating to the required amount of the content of the copper component contained therein.

Means to Resolve the Problems

The inventors, after serious investigation, completed this invention as finding that the above-identified problem may be resolved by using the friction material composition for the friction material used for the disc brake pad manufactured by forming the NAO friction material composition, which contains the predetermined amount of ferrous sulfide (FeS) particles as the lubricant and contains the 5 weight % or less in total of the copper component relative to the total amount of the friction material composition.

This invention relates to a friction material utilized for a disc brake pad, which is manufactured by forming the NAO friction material composition and is based on the following technology.

(1) The friction material used for the disc brake pad which is manufactured by forming the friction material composition, which contains 1-15 weight % of the ferrous sulfide (FeS) particles relative to the total amount of the friction material composition as the lubricant and contains 5 weight % or less of the copper component relative to the total amount of the friction material composition.

(2) The friction material composition according to the above (1), in which the friction material composition further contains 0.3-5 weight % of flaky graphite particles with an average particle diameter of 1-100 μm relative to the total amount of the friction material composition as the lubricant.

(3) The friction material composition according to the above (2), in which the flaky graphite particles are contained in the form of aggregates.

(4) The friction material composition according to (1) or (3), in which the friction material composition contains 4-12 weight % of a binder relative to the total amount of the friction material composition, 1-7 weight % of the organic fiber relative to the total amount of the friction material composition, and 3-8 weight % of the organic friction modifier relative to the total amount of the friction material composition.

Advantages of the Invention

In relation to a friction material manufactured by forming a non-asbestos-organic (NAO) friction material composition, which is used for a disc brake pad, this invention can provide the friction material capable of securing a braking effectiveness and wear resistance under the high speed and high load braking conditions while satisfying laws and regulations relating to the required amount of the content of the copper component.

EMBODIMENTS OF THE INVENTION

According to this invention, in the friction material used for the disc brake pad, which is manufactured by forming the friction material composition, the friction material composition used herein contains 1-15 weight % of the ferrous sulfide (FeS) particles relative to the total amount of the friction material composition as the lubricant and the total amount of the copper component contained in the friction material composition is less than 5 weight % relative to the total amount of the friction material composition.

The ferrous sulfide (FeS) particles functions as the lubricant to improve the wear resistance and at the same time functions as the friction modifier to improve the braking effectiveness under the high speed and high load braking conditions.

This improvement is estimated to be due to the property that the ferrous sulfide (FeS) is decomposed into an iron and sulfur when the ferrous sulfide (FeS) is exposed to the temperature at 1100 degrees centigrade under oxygen free condition.

Under the high speed and high load braking conditions, the temperature of contacting surface between the friction material and a disc rotor made by cast iron as a mated member momentarily reaches 1100 degrees centigrade or more. At the same time, an organic substance contained in the friction material is oxidized, so that an area around the contacting surface falls into the condition that the oxygen is significantly reduced.

Upon reaching the above-condition, the ferrous sulfide particles being decomposed on the friction surface of the friction material is decomposed into the iron and sulfur, and an iron component film resulted from the ferrous sulfide particles is formed on the friction surface of the friction material.

This iron component film and an iron component of the corresponding member cause adhesive friction to improve the braking effectiveness.

Also, the iron sulfide may be such as a ferric sulfide (Fe2S3) and an iron disulfide (FeS2) in addition to the ferrous sulfide (FeS), but the above-explained advantages cannot be expected for the ferric sulfide (Fe2S3) and the iron disulfide (FeS2).

The ferrous sulfide (FeS), for example, may be EUROLUB-1010 made by Catalise group, which is commercially available.

Also, this invention is characterized to further contain 0.3-5 weight % of flaky graphite particles with an average diameter of 1-100 μm relative to the total amount of the friction material composition as the lubricant.

The flaky graphite particles are highly, thermally conductive flat or squamous shaped graphite particles, which may be manufactured by adding highly concentrated sulfuric acid, nitric acid, and oxidizer to graphite particles such as a natural squamous shaped graphite, a kish graphite, and a thermal decomposition graphite, compounding the same at an appropriate temperature for an appropriate period to obtain the compound of the sulfuric acid and graphite layer, washing the compound, heating the washed compound at 1000 degrees centigrade high temperature to expand the graphite particles in the thickness direction by 100-300 times to obtain an expanded graphite, and using methods such as a method of crushing the expanded graphite under the condition that the liquid is being filled in apertures of the expended graphite particles or the liquid being frozen therein, a method of dispersing the expended graphite particles in the liquid to act ultrasound in the liquid, a method dispersing the expanded graphite particles in the liquid to frictionally crush by acting a milling media in the liquid, and a method of dipping the expended graphite into the dispersed media, crushing the same to obtain graphite slurry, and precisely crushing the graphite slurry using a grinding mill.

Adding an adequate amount of the flaky graphite particles to the friction material composition enables the friction material to quickly reduce the temperature of the friction material that increases momentarily under the high speed and high load braking conditions, therefore, an immoderate decomposition of ferrous sulfide may be controlled.

The flaky graphite particles for example may be Surface Enhanced Flake Graphite series made by Asbury Carbons, Incorporated, which is commercially available.

Also, it is preferable for the flaky graphite particles contained in the friction material composition to be in the form of aggregates.

By adding the flaky graphite particles in the form of aggregates to the friction material composition, the flaky graphite particles in the friction material can be dispersed uniformly therein. The average particle diameter of the granulated product is preferably 30-500 μm.

The aggregates of the flaky graphite particles is manufactured by a general practicable granulation method such as a method for compressing the flaky graphite particles by a roller compactor and regulating the compressed particles by a regulator, a method for granulating the flaky graphite particles by using a publicly available granulator such as a rotating drum granulator, a fluidized bed granulator, and a rolling fluidized bed granulator.

The aggregates of the flaky graphite particles, for example, may be C-TERM (US trademark registration by Timcal S.A.), which is commercially available.

Also, the average particle diameter thereof used in this invention is 50% particle diameter measured by a laser diffraction particle size distribution method.

Furthermore, in this invention, the friction material composition comprises 4-12 weight % of the binder relative to the total amount of the friction material composition, 1-7 weight % of the organic fiber relative to the friction material composition, 3-8 weight % of the organic friction modifier relative to the friction material composition are added to the friction material composition.

The content of the organic substances, i.e., the binder, the organic fiber, and the organic friction modifier is set as the above described amount, it is possible to approximate an atmosphere near by the contacting surface between the friction material and disc rotor to oxygen free condition under high speed and high load braking conditions without decreasing of the wear resistance.

Using the above-described friction material composition in the friction material used for the disc brake pad, which is manufactured by forming the NAO friction material composition, can provide the friction material that can secure the required performance of the braking effectiveness and the wear resistance under the high speed and high load braking conditions while satisfying laws and regulations relating to the required amount of the content of the copper component.

The friction material of this invention includes conventionally used substances for the friction material such as the binder, the fiber base, the titanate, the lubricant, the inorganic friction modifier, the organic friction modifier, pH adjuster, and the filler in addition to the above-described ferrous sulfide (FeS), flaky graphite particles, and aggregates of the flaky graphite particle.

The binder may be one or any combination of two or more conventionally used binder for the friction material such as a straight phenolic resin, a resin modified by a cashew oil, a silicone oil, or various elastomers such as an acrylic rubber, an aralkyl modified phenolic resin obtained by reacting the phenol, aralkyl ether, and aldehyde, and a thermosetting resin dispersing various elastomer and fluoropolymer in the phenolic resin. The content of the binder is preferably 4-12 weight %, more preferably 5-8 weight % relative to the total amount of the friction material composition.

The fiber base may be one or any combination of two or more of the conventionally used organic fibers for the friction material such as an aramid fiber, a cellulosic fiber, a polyparaphenylene benzobisoxazole (PBO) fiber, and an acrylic fiber, and the conventionally used metallic fibers for the friction material such as a copper fiber, a bronze fiber, a brass fiber, an aluminum fiber, and a zinc fiber.

The content of the organic fiber is preferably 1-7 weight %, more preferably 2-4 weight % relative to the total amount of the friction material composition.

The content of the metallic fiber is preferably less than 7 weight %, more preferably less than 4 weight % relative to the total amount of the friction material composition. When the metallic fiber containing the copper component is utilized, the total amount of the copper component is preferably less than 5 weight %, more preferably 0.5 weight % relative to the total amount of the friction material composition. Also, from the reduction of environmental burden point of view, the friction material composition with no copper component is preferable.

The titanate is preferably in a plate like or an indefinite shape having multiple convex portions and may be one or any combination of two or more of the conventionally used titanate for the friction material such as a potassium titanate, a lithium potassium titanate, and a potassium magnesium titanate. The content of the titanate is preferably 7-35 weight %, more preferably 17-25 weight % relative to the total amount of the friction material composition.

For the lubricant, other than the above-described ferrous sulfide (FeS) particles, flaky graphite particles and flaky graphite particle aggregates, the lubricant may be one or any combination of two or more of the metal sulfide type lubricant such as a molybdenum disulfide, a zinc sulfide, a tin sulfide, and a composite metal sulfide, and the conventionally used carbon type lubricant for the friction material such as a graphite other than the above-described flaky graphite particles, a petroleum coke, an active carbon, and a crushed polyacrylonitrile oxidized fiber pulverized powder. The content of the lubricant together with the above-described ferrous sulfide (FeS) particles, flaky graphite particles and aggregates of the flaky graphite particle is preferably 2-21 weight %, more preferably 10-16 weight % relative to the total amount of the friction material composition.

The inorganic friction modifier may be one or any combination of two or more of the conventionally used particle inorganic modifier for the friction material such as a mica, a vermiculate, a triiron tetraoxide, a calcium silicate hydrate, a glass beads, a magnesium oxide, a zirconium oxide, a zirconium silicate, an alumina, and a carbon silicate, and the conventionally used fiber inorganic friction modifier for the friction material such as a wollastonite, a sepiolite, a basalt fiber, a glass fiber, a biosoluble artificial mineral fiber, and a rock wool. The content of the inorganic friction modifier is preferably 15-50 weight, more preferably 20-45 weight % relative to the total amount of the friction material composition.

The organic friction modifier may be one or any combination of two or more of the conventionally used organic friction modifier such as a cashew dust, a pulverized powder of tire tread rubber, and a vulcanized or an unvulcanized rubber powder such as a nitrile rubber, an acrylic rubber, a silicone rubber, and a butyl rubber. The content of the organic friction modifier is preferably 3-8 weight %, more preferably 4-7 weight % of the total amount of the friction material composition.

Calcium hydroxide or the like that is a conventional pH adjuster may be used as pH adjuster. The content of the friction material composition is preferably 2-6 weight %, more preferably 2-3 weight % relative to the total amount of the friction material composition.

The remaining substances in the friction material composition may be a filler such as a barium sulfate and a calcium carbonate.

The friction material of this invention used for the disc brake is manufactured through a mixing step for uniformly mixing the predetermined amount of the friction material composition by a mixer, a heat press forming step for superposing and placing the obtained raw friction material mixture and a pre-washed, pre-surface treated, and pre-adhesive coated back plate in a heat press die to be heat pressed, thereby forming in the die, a heat treatment step for heating the obtained molded product to complete the curing reaction of the binder, an electrostatic powder coating step for coating a powder coating, a coating baking step for baking the coating thereon, and a grinding step for forming the friction surface by a rotary grindstone. Also, after the heat press forming step, it is possible to process through the coating step, the heat treatment step in combination with the coating baking step, and the grinding step.

As necessary, before the heat press forming step, it is possible to process through a granulation step for granulating the raw friction material mixture, a kneading step for kneading the raw friction material mixture, and a preforming step for placing the friction material mixture, obtained granulated substance after the granulation step, and/or obtained kneaded substance after the kneading step and forming the preformed substance, and after the heat press forming step, a scorching step is performed.

EMBODIMENTS

In the following sections, embodiments and comparative examples of this invention will be explained concretely; however, this invention is not limited to the following embodiments.

Manufacturing Method for Friction Material in Embodiments 1-15 and Comparative Example 1-4

The friction material composition shown in TABLE 1, TABLE 2, and TABLE 3 is mixed for 5 minutes by the Loedige mixer and is pressed in the forming die for 10 seconds under 30 MPa. This preformed substance is superposed on the steel back plate that is pre-washed, pre-surface treated, and pre-adhesive coated, formed in the heat forming die at 150 degrees centigrade of the forming temperature under 40 MPa of the forming pressure for 10 minutes. After that, heat-treated (cured) at 200 degrees centigrade for 5 hours, and grinded to form the friction surface in order to manufacture the disc brake pad for a passenger ca. (See Embodiments 1-15 and Comparative Examples 1-4).

The obtained friction material is used to evaluate the braking effectiveness and wear resistance under the high speed and high brake load conditions. The results of the evaluation are shown in TABLE 1, TABLE 2, and TABLE 3, and the evaluation standard is shown in TABLE 4.

TABLE 1

| | | | Embodiment | | | | | | | |
|---|---|---|---|---|---|---|---|---|---|---|
| | | | 1 | 2 | 3 | 4 | 5 | 6 | 7 | 8 |
| Binder | | Straight Phenolic Resin | 3 | 3 | 3 | 3 | 3 | 3 | 3 | 3 |
| | | Aralkyl Modified Phenolic Resin | 3 | 3 | 3 | 3 | 3 | 3 | 3 | 3 |
| Fiber Base Material | Metallic Fiber | Copper Fiber | | | | | | | | |
| | Organic Fiber | p-Aramid Pulp | 2 | 2 | 2 | 2 | 2 | 2 | 2 | 2 |
| Lubricant | Metal Sulfide Type Lubricant | Zinc Sulfide | 1 | 1 | 1 | 1 | 1 | 1 | 1 | 1 |
| | | Ferrous Sulfide (FeS) | 10 | 10 | 10 | 10 | 10 | 10 | 1 | 15 |
| | Carbon Type Lubricant | Coke | 2 | 2 | 2 | 2 | 2 | 2 | 2 | 2 |
| | | Flaky Graphite Particles (Average Particle Diameter 0.5 μm) | 3 | | | | | | | |
| | | Flaky Graphite Particles (Average Particle Diameter 1 μm) | | 3 | | | | | | |
| | | Flaky Graphite Particles (Average Particle Diameter 100 μm) | | | 3 | | | | | |
| | | Flaky Graphite Particles (Average Particle Diameter 200 μm) | | | | 3 | | | | |
| | | Aggregates of Flaky Graphite Particle (Average Particle Diameter 70 μm) | | | | | 3 | | 3 | 3 |
| | | Natural Squamous Shaped Graphite (Average Particle Diameter 100 μm) | | | | | | 3 | | |
| Titanate | | Plate Like Potassium Hexatitanate | 20 | 20 | 20 | 20 | 20 | 20 | 20 | 20 |
| Inorganic Friction Modifier | | Alumina | 2 | 2 | 2 | 2 | 2 | 2 | 2 | 2 |
| | | Zirconium Silicate | 8 | 8 | 8 | 8 | 8 | 8 | 8 | 8 |
| | | Vermiculite | 2 | 2 | 2 | 2 | 2 | 2 | 2 | 2 |
| | | Rock Wool | 3 | 3 | 3 | 3 | 3 | 3 | 3 | 3 |
| | | Mica | 10 | 10 | 10 | 10 | 10 | 10 | 10 | 10 |
| Organic Friction Modifier | | Pulverized Powder of Tire tread Rubber of Heavy Duty Truck | 2 | 2 | 2 | 2 | 2 | 2 | 2 | 2 |
| | | Cashew Dust | 3 | 3 | 3 | 3 | 3 | 3 | 3 | 3 |
| pH Adjuster | | Calcium Hydroxide | 2 | 2 | 2 | 2 | 2 | 2 | 2 | 2 |
| Others | | Barium Sulfate | 24 | 24 | 24 | 24 | 24 | 24 | 33 | 19 |
| | Total | | 100 | 100 | 100 | 100 | 100 | 100 | 100 | 100 |
| Evaluation | | Braking Effectiveness under High Speed and High Brake Load Conditions | ◎ | ◎ | ○ | Δ | ◎ | ◎ | Δ | ◎ |
| | | Wear Resistance | Δ | ○ | ◎ | ◎ | ◎ | ◎ | Δ | Δ | ◎ |

TABLE 2

| | | | Embodiment | | | | | | |
|---|---|---|---|---|---|---|---|---|---|
| | | | 9 | 10 | 11 | 12 | 13 | 14 | 15 |
| Binder | | Straight Phenolic Resin | 3 | 3 | 3 | 3 | 3 | 2 | 6 |
| | | Aralkyl Modified Phenolic Resin | 3 | 3 | 3 | 3 | 3 | 2 | 6 |
| Fiber Base Material | Metallic Fiber | Copper Fiber | 3 | | | | | | |
| | Organic Fiber | p-Aramid Pulp | 2 | 2 | 2 | 2 | 2 | 1 | 7 |
| Lubricant | Metal Sulfide Type Lubricant | Zinc Sulfide | 1 | 1 | 1 | 1 | 1 | 1 | 1 |
| | | Ferrous Sulfide (FeS) | 1 | 10 | 10 | 10 | 10 | 10 | 10 |
| | Carbon Type Lubricant | Coke | 2 | 2 | 2 | 2 | 2 | 2 | 2 |
| | | Flaky Graphite Particles (Average Particle Diameter 0.5 μm) | | | | | | | |
| | | Flaky Graphite Particles (Average Particle Diameter 1 μm) | | 0.3 | | 0.1 | | | |
| | | Flaky Graphite Particles (Average Particle Diameter 100 μm) | | | 5 | | 7 | | |
| | | Flaky Graphite Particles (Average Particle Diameter 200 μm) | | | | | | | |
| | | Aggregates of Flaky Graphite Particle (Average Particle Diameter 70 μm) | 3 | | | | | 3 | 3 |
| | | Natural Squamous Shaped Graphite (Average Particle Diameter 100 μm) | | | | | | | |
| Titanate | | Potassium Hexatitanate | 20 | 20 | 20 | 20 | 20 | 20 | 20 |
| Inorganic Friction Modifier | | Alumina | 2 | 2 | 2 | 2 | 2 | 2 | 2 |
| | | Zirconium Silicate | 8 | 8 | 8 | 8 | 8 | 8 | 8 |
| | | Vermiculite | 2 | 2 | 2 | 2 | 2 | 2 | 2 |
| | | Rock Wool | 3 | 3 | 3 | 3 | 3 | 3 | 3 |
| | | Mica | 10 | 10 | 10 | 10 | 10 | 10 | 10 |
| Organic Friction Modifier | | Pulverized Powder of Tire tread Rubber of Heavy Duty Truck | 2 | 2 | 2 | 2 | 2 | 1.5 | 4 |
| | | Cashew Dust | 3 | 3 | 3 | 3 | 3 | 1.5 | 4 |
| pH Adjuster | | Calcium Hydroxide | 2 | 2 | 2 | 2 | 2 | 2 | 2 |
| Others | | Barium Sulfate | 30 | 26.7 | 22 | 26.9 | 20 | 29 | 10 |
| | | Total | 100 | 100 | 100 | 100 | 100 | 100 | 100 |
| Evaluation | | Braking Effectiveness under High Speed and High Brake Load Conditions | ◎ | ◎ | ○ | ○ | Δ | Δ | ○ |
| | | Wear Resistance | ◎ | Δ | ◎ | Δ | ◎ | Δ | ○ |

TABLE 3

| | | | COMPARATIVE EXAMPLE | | | |
|---|---|---|---|---|---|---|
| | | | 1 | 2 | 3 | 4 |
| Binder | | Straight Phenolic Resin | 3 | 3 | 3 | 3 |
| | | Aralkyl Modified Phenolic Resin | 3 | 3 | 3 | 3 |
| Fiber Base Material | Metallic Fiber | Copper Fiber | | | 5 | |
| | Organic Fiber | p-Aramid Pulp | 2 | 2 | 2 | 2 |
| Lubricant | Metal Sulfide Type Lubricant | Zinc Sulfide | 1 | 1 | 2 | 2 |
| | | Ferrous Sulfide (FeS) | 0.5 | 20 | 0 | 0 |
| | Carbon Type Lubricant | Coke | 2 | 2 | | |
| | | Flaky Graphite Particles (Average Particle Diameter 0.5 μm) | | | | |
| | | Flaky Graphite Particles (Average Particle Diameter 1 μm) | | | | |
| | | Flaky Graphite Particles (Average Particle Diameter 100 μm) | | | | |
| | | Flaky Graphite Particles (Average Particle Diameter 200 μm) | | | | |
| | | Aggregates of Flaky Graphite Particle (Average Particle Diameter 70 μm) | 3 | 3 | 3 | 3 |
| | | Natural Squamous Shaped Graphite (Average Particle Diameter 100 μm) | | | | |
| Titanate | | Plate Like Potassium Hexatitanate | 20 | 20 | 20 | 20 |
| Inorganic Friction Modifier | | Alumina | 2 | 2 | 2 | 2 |
| | | Zirconium Silicate | 8 | 8 | 8 | 8 |
| | | Vermiculite | 2 | 2 | 2 | 2 |
| | | Rock Wool | 3 | 3 | 3 | 3 |
| | | Mica | 10 | 10 | 10 | 10 |

TABLE 3-continued

|  |  | COMPARATIVE EXAMPLE | | | |
|---|---|---|---|---|---|
|  |  | 1 | 2 | 3 | 4 |
| Organic Friction Modifier | Pulverized Powder of Tire tread Rubber of Heavy Duty Truck | 2 | 2 | 2 | 2 |
|  | Cashew Dust | 3 | 3 | 3 | 3 |
| pH Adjuster | Calcium Hydroxide | 2 | 2 | 2 | 2 |
| Others | Barium Sulfate | 33.5 | 14 | 30 | 35 |
|  | Total | 100 | 100 | 100 | 100 |
| Evaluation | Braking Effectiveness under High Speed and High Brake Load Conditions | X | Δ | ◎ | X |
|  | Wear Resistance | ○ | X | ◎ | Δ |

TABLE 4

| Evaluation Items | Braking Effectiveness under High Speed and High Braking Load Conditions | Wear Resistance |
|---|---|---|
| Evaluation Method | Test Method: Based on JASO C406 Test condition: 150% speed (driving speed before braking) of auto motor und sport (AMS), German Automobile Journal High Speed Pattern Simulation Test 240 km/h → 5 km/h (Deceleration 0.6 G) × 1 Cycle | |
|  | Minimum Value of Average μ Final Braking | Amount of Wear of Friction Material |
| ◎ | 0.20 or more | less than 2.0 mm |
| ○ | less than 0.20, 0.15 or more | 2.0 mm or more, less than 3.0 mm |
| Δ | less than 0.15, 0.10 or more | 3.0 mm or more, less than 4.0 mm |
| x | less than 0.10 | 4.0 mm or more |

INDUSTRIAL APPLICABILITY

According to this invention, the friction material used for the disc brake pad, which is manufactured by forming the NAO friction material composition, secures the braking effectiveness and the wear resistance under the high speed and high load braking conditions while satisfying laws and regulations relating to the required amount of the content of the copper component, thereby having a highly practical value.

The invention claimed is:

1. A friction material used for a disc brake pad, which is manufactured by forming a non-asbestos-organic friction material composition, wherein
said friction material composition contains
(1) 4-12 weight % of a binder relative to the total amount of the friction material composition,
(2) 1-7 weight % of an organic fiber relative to the total amount of the friction material composition,
(3) 3-8 weight % of an organic friction modifier relative to the total amount of the friction material composition, and
(4) 1-15 weight % of iron (II) sulfide (FeS) particles relative to the total amount of the friction material composition as a lubricant, and
the total amount of copper component contained in the friction material composition is less than 5 weight % relative to the total amount of the friction material composition.

2. The friction material composition according to claim 1, wherein
said friction material composition further contains 0.3-5 weight % of exfoliated graphite particles with an average particle diameter of 1-100 μm relative to the total amount of the friction material composition.

3. The friction material composition according to claim 2, wherein
said exfoliated graphite particles are contained in the friction material composition in the form of aggregates.

* * * * *